United States Patent [19]

Johnson

[11] 4,306,799
[45] Dec. 22, 1981

[54] DUAL ACTUATOR SWITCHES FOR FLASH AND EXPOSURE MODES

[75] Inventor: Bruce K. Johnson, Andover, Mass.

[73] Assignee: Polaroid Corporation, Cambridge, Mass.

[21] Appl. No.: 165,392

[22] Filed: Jul. 2, 1980

[51] Int. Cl.³ .................. G03B 17/38; G03B 17/50; G03B 15/03
[52] U.S. Cl. .................................. 354/266; 354/86; 354/145
[58] Field of Search .................. 354/145, 230, 27, 32, 354/266, 268

[56] References Cited

U.S. PATENT DOCUMENTS

| | | | |
|---|---|---|---|
| 3,186,319 | 6/1965 | Hochstein | 354/266 |
| 3,380,366 | 4/1968 | Olson | 354/268 X |
| 3,643,567 | 2/1972 | Douglas | 354/187 |
| 4,000,500 | 12/1976 | Ivester et al. | 354/174 |
| 4,001,640 | 1/1977 | Biber | 354/145 X |
| 4,032,941 | 6/1977 | Douglas et al. | 354/230 |
| 4,038,674 | 7/1977 | Whiteside et al. | 354/230 |
| 4,040,072 | 8/1977 | Johnson et al. | 354/230 X |
| 4,071,851 | 1/1978 | Johnson | 354/354 |
| 4,085,414 | 4/1978 | Burgarella et al. | 354/145 |
| 4,135,797 | 1/1979 | Ohmura et al. | 354/268 X |
| 4,160,589 | 7/1979 | Johnson et al. | 354/86 |
| 4,231,645 | 11/1980 | Davis et al. | 354/145 |

*Primary Examiner*—Donald A. Griffin
*Attorney, Agent, or Firm*—Leslie J. Payne

[57] ABSTRACT

For charging a flash device in a photographic apparatus, there is provided a flash charging actuator manually displaceable between an off position and a charge position. For commencing exposure in such apparatus, there is a camera actuator manually displaceable between an off position and an exposure position. The flash charging actuator includes a cover portion for covering a finger engagable portion of the camera actuator when the former actuator is in its off position for inhibiting operation of the latter. Moving the charging actuator to its charge position uncovers the finger engagable portion so that the camera operator can sequentially depress the camera actuator after the flash device has been charged.

16 Claims, 6 Drawing Figures

DUAL ACTUATOR SWITCHES FOR FLASH AND EXPOSURE MODES

BACKGROUND OF THE INVENTION

The present invention relates, in general, to the field of photography and, more specifically, to photographic apparatus having manually operable dual actuators for facilitating sequential actuation of two different modes of apparatus operation.

The present invention is directed to improvements in photographic apparatus of the type generally disclosed in commonly-assigned copending applications: Ser. No. 54,598, entitled "Camera With Folding Flash Unit", filed July 3, 1979, by Bruce K. Johnson and George D. Whiteside; and Ser. No. 54,652, entitled "Camera With Telescoping Dual Actuators", filed July 3, 1979, by Carl W. Davis and Joseph E. Murray, Jr.; respectively. These cameras essentially include an electronic strobe-type flash unit powered by a battery which battery also powers the camera's electrical system. To prevent the battery's power delivery rate being exceeded so as to minimize its power drain and to prevent actuation of an exposure cycle before the flash is fully charged when it is desired to fire the latter, a sequential actuating system is provided. Such a system operates essentially to charge the flash unit storage capacitor immediately preceding the film exposure and processing cycle.

For instance, the approach taken in the aforenoted application Ser. No. 54,598 provides sequential actuation. This is, in part, accomplished by a dual actuator housed in an elongated actuator housing formed on one side of the camera. Extending from the actuator housing towards the camera user is a first actuator push button and longitudinally opposed therefrom is a forwardly facing second actuator button. In use, the first actuator push button is pushed forwardly for causing closing of an internal electrical switch. Closing of this switch allows the film pack battery to charge a flash unit capacitor. When charging is complete, as indicated by a visual signal in the viewfinder, the user pushes rearwardly on the second button. This latter movement causes an internal slider arrangement to effectively close a second internal electrical switch for initiating an automatic cycle of camera operation including film exposure with supplemental artificial illumination provided by the charged flash unit. This system works satisfactorily. There is, however, potential for problems.

For example, it might be somewhat awkward for the user to refrain from pushing rearwardly on the second forward facing push button while simultaneously with his second finger pushing forwardly with his thumb on the rearwardly facing first actuator push button. As a consequence thereof, inadvertent actuation of the exposure cycle could arise.

In anticipation of a user inadvertently operating the actuators in the wrong sequence, additional logic circuitry would be necessary for electrically blocking out an exposure start signal which is produced by operation of the second actuator push button. However, use of additional logic circuitry denies the user the option of initiating an exposure cycle of camera operation exclusive of the flash firing. This would be a problem whenever it is desired to, for example, take an exposure through a glass window wherein it is not desired to fire the flash unit. Additionally, battery drainage is a potential problem because of the absence of an inhibiting circuit for preventing inadvertent operation of a flash charge actuator when the camera is not being used.

The approach taken in copending U.S. patent application Ser. No. 54,652 overcomes the aforenoted potential for problems by eliminating the forward and aft placement of the first and second actuators as well as allowing the bypassing of the flash charging actuator when directly initiating an automatic cycle of camera operation. As described in this application, a dual actuating telescoping push button arrangement is provided. Specifically, a small forward inner button is initially depressed for effecting strobe charging. Thereafter, the photographer presses an outer button without releasing the inner button. The automatic cycle of camera operation is initiated upon the outer button effecting contact with an internal switch in the camera. While the foregoing approach successfully eliminates many of the potential problems associated with the foregoing described unit, there nevertheless exists a potential problem in that a user may inadvertently press the wrong button.

Other examples of cameras having dual actuators of the general type noted are referred to in commonly-assigned U.S. Pat. Nos. 4,001,640 and 4,085,414. It should be noted, however, that use of these dual actuators are somewhat awkward and their structure is not compatible with the noted internal slider switching arrangements of the foregoing cameras. This slider switching arrangement has proven it to be an extremely reliable device in, for example, the Pronto! and One Step cameras manufactured by the Polaroid Corporation, Cambridge, Mass.

SUMMARY OF THE INVENTION

In accordance with the present invention, the aforenoted potential for problems of inadvertent and improper use of dual actuators of the type mentioned above are substantially diminished. This is achievable by provision of an improved actuator apparatus for greatly inhibiting improper sequential actuation of dual actuators.

As in prior dual actuators for use with photographic apparatus having a housing, an artificial illumination device is connected to the housing and is energizable by energizing means for providing a pulse of illumination. An exposure control system is provided for initiating an exposure interval upon being energized by the energizing means. A first means is provided with a manually accessible portion and is movable between an off or inoperative position to an operative or charging position in response to being manually displaced so that during movement toward the operative position the energizing means energizes the illuminating device. A second means having a manually accessible portion is operable for movement between an off or inoperative position and an operative or exposure position. When the second means is in the operative position, the energizing means energizes the exposure control system for initiating exposure.

In an illustrated embodiment, the first means includes a cover connected to a portion of the housing for movement between the inoperative and operative positions. When in the inoperative position the first means is in substantially covering relation to the manually accessible portion of the second means to thereby inhibit actuation of the latter's manually accessible portion. Moving this cover to the charging position connects the energizing means to the artificial illuminating device for energizing the latter. Simultaneously, such movement significantly uncovers the manually accessible portion of the second means. Advantageously, this facilitates sequential actuation of the second switch for initiating exposure control.

Among the objects of the invention are, therefore, the provision of an improved actuator apparatus for greatly inhibiting inadvertent sequential operation of one of a pair of actuators; the provision of an improved actuator apparatus which inhibits inadvertent sequential operation while simultaneously permitting independent actuation of either one of the actuators; and the provision of an improved camera apparatus having a dual actuator for greatly inhibiting inadvertent sequential actuation of one of a pair of actuators while simultaneously permitting independent actuation of either one of the pair of actuators.

Other objects and further scope of applicability of the present invention will become apparent from the detailed description to follow when taken in conjunction with the accompanying drawings wherein like parts are designated by like reference numerals throughout the several views.

DETAILED DESCRIPTION

Figure 1:
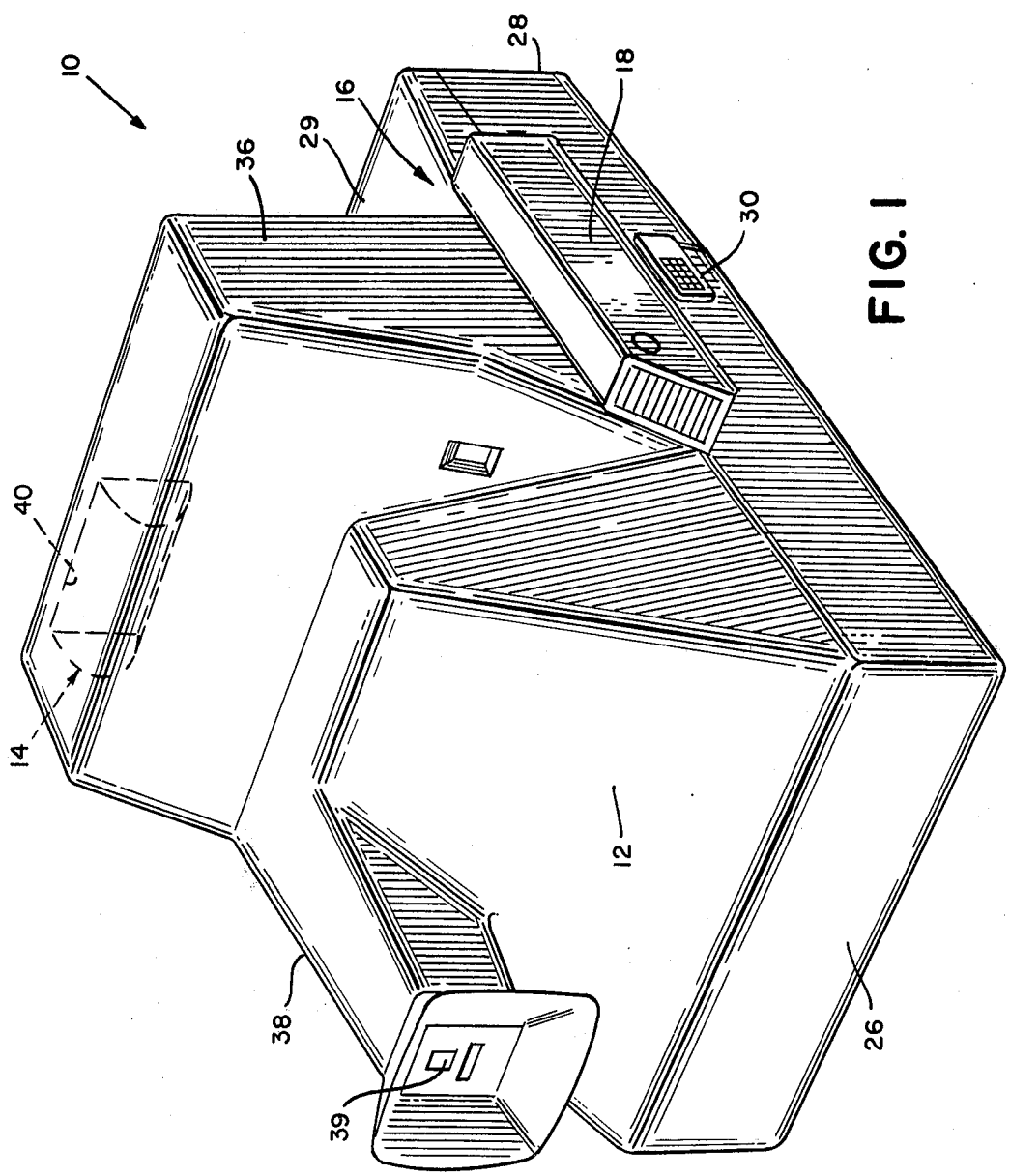
FIG. 1 is a perspective view illustrating a camera incorporating the improved dual actuator of the present invention.
Figure 2:
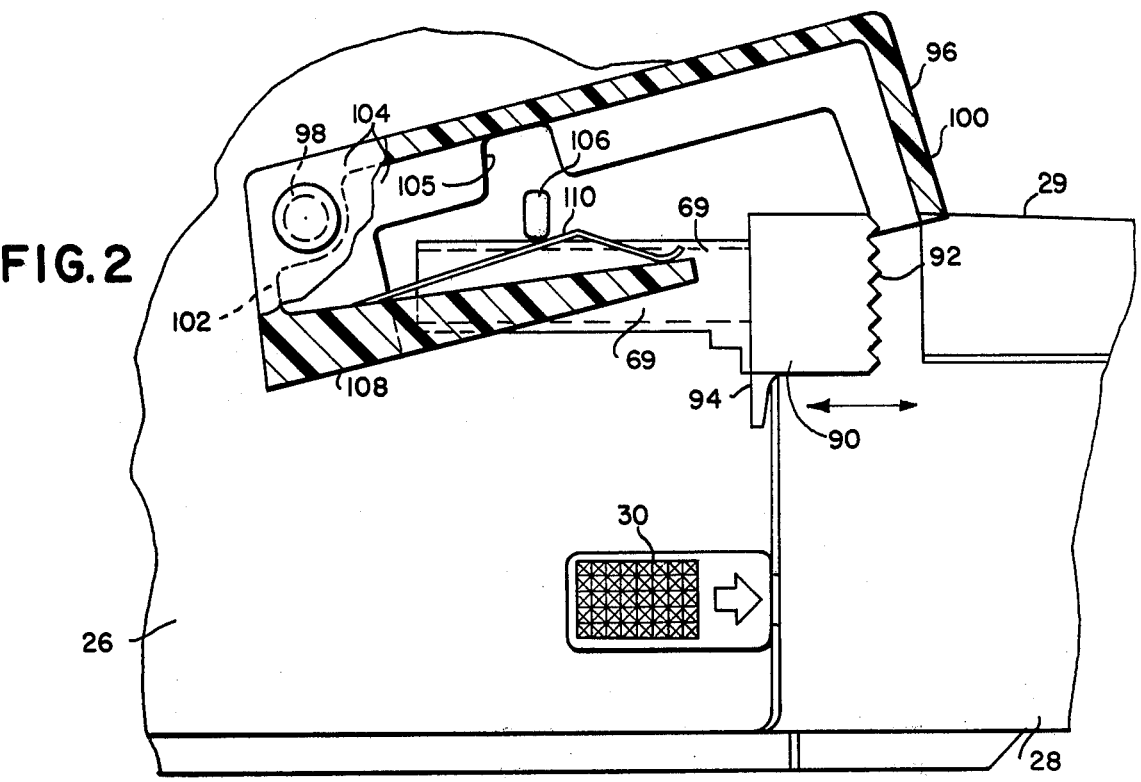
FIG. 2 is an enlarged elevational view, partly broken away, illustrating details of the dual actuator when in one condition of operation.
Figure 3:
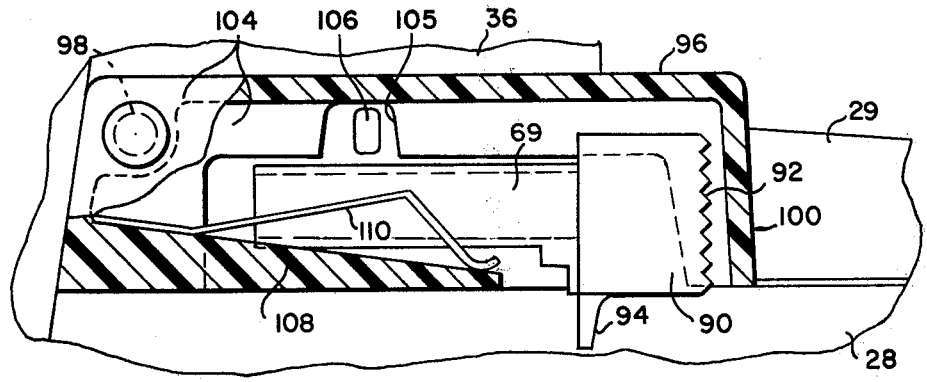
FIG. 3 is a view similar to FIG. 2 but showing the dual actuator in another position of operation.

Referring to FIGS. 1-3, the improved camera apparatus 10 includes a camera housing 12 having in a section thereof an electronic flash unit 14. Connected to one side of the housing 12 is a dual actuator arrangement 16 of the present invention. Essentially, the dual actuator arrangement 16 is operative for charging a storage capacitor (not shown) in the flash unit 14 and for initiating an automatic cycle of camera operation including initiating a film exposure cycle. Components of the dual actuating arrangement 16 include a first or pivotal flash charge actuator 18 and a second or slider switch actuator 20.

In this embodiment, the camera 10 is of the self-developing type and is configured for use with a film pack 22 (FIG. 5) of the kind including a stack of self-developing film units 24, as well as a generally flat electrical battery. The battery is for powering the camera's electrical system including the electronic flash unit 14. For a representative example of the film pack, see commonly assigned U.S. Pat. No. 3,877,045.

A bottom base section 26 of the camera housing 12 has a chamber configured for housing the film pack 22 so that the uppermost one of the stacked film units 24 is at the camera's focal plane. Extending forwardly of the base section 26 is a pivotally mounted loading door section 28. For releasably retaining the door section 28 in the closed condition, there is provided a slidable latch 30. The slide latch 30 can be operated so that the loading door section 28 may be pivoted downwardly for providing access to an open end of the film pack receiving chamber. Also, it is to be noted that the loading door section 28 houses a pair of motor driven pressure-applying rollers 32. For facilitating withdrawal of the film units 24 from the film pack 22 when the loading door section 28 is in its closed position (see FIG. 5), the bite of the rollers is in alignment with a film unit withdrawal slot 34. Consistent with the operation of the self-developing cameras of the foregoing type, it will be understood that the uppermost film unit 24 is advanced between the rollers 32 for processing in a well-known manner and then pass through an elongated exit slot (not shown) formed on the front wall of the loading door section 28 to the exterior of the camera.

Again referring to FIG. 1, there is seen an upstanding generally box-like shutter housing section 36. Housed within this section 36 is a majority of the camera's exposure control components. For a more detailed description of the shutter housing in the context of the exposure control components reference is made to the last noted application. Connected to one side wall of the shutter section 36 is the dual actuator arrangement 16. Rearwardly extending from the camera housing 12 is a viewfinder tube 38. Included in the tube is a rear lens 39 which optically communicates with a front lens (not shown) in the front face of the shutter section 36.

Referring back to the flash unit 14, it too is included within the shutter section 36. Such flash unit 14 includes a light output window 40 so as to direct light from the flash unit toward the object to be photographed. It will be appreciated that the flash unit 14 is electrically connected to a flash charge and operating logic circuit positioned within the shutter housing section 36.

The mechanisms employed in the camera 10 for purposes of effecting a complete automatic cycle of camera operation including film exposure and subsequent film processing are set forth in greater detail in commonly assigned U.S. Pat. No. 4,040,072 issued to Bruce K. Johnson and George D. Whiteside on Aug. 2, 1977. For instance, the shutter mechanism includes a pair of overlapping shutter blades of the well-known scanning type. These blades are reciprocally driven by a pivoting walking beam mechanism between positions blocking and gradually unblocking the exposure path through the camera lens to the focal plane by the way of a reflecting inclined mirror (not shown). For driving the blades to the blocking position, a solenoid is provided. When energized, the solenoid overcomes the biasing of a spring which spring generally tends to drive the blades to the unblocking position. Therefore, when the solenoid is deenergized, the spring is effective for driving the blades to the unblocking position. For purposes of maintaining the shutter blades in their scene light blocking condition while at the same time avoiding a power drain for purposes of energizing the solenoid, there is provided a shutter release mechanism. Essentially, the shutter release mechanism, upon commencement of the exposure cycle, will permit the shutter blade spring to drive the blades to the opening position and when the solenoid is deenergized, it will retain the shutter blades in their scene light blocking position despite deenergization of the solenoid. This particular shutter release mechanism does not form an aspect of the present invention. Therefore, details not necessary for an understanding of this invention have been omitted. However, a more detailed description of the foregoing described shutter release mechanism is described in the last noted U.S. Patent.

Figure 4:
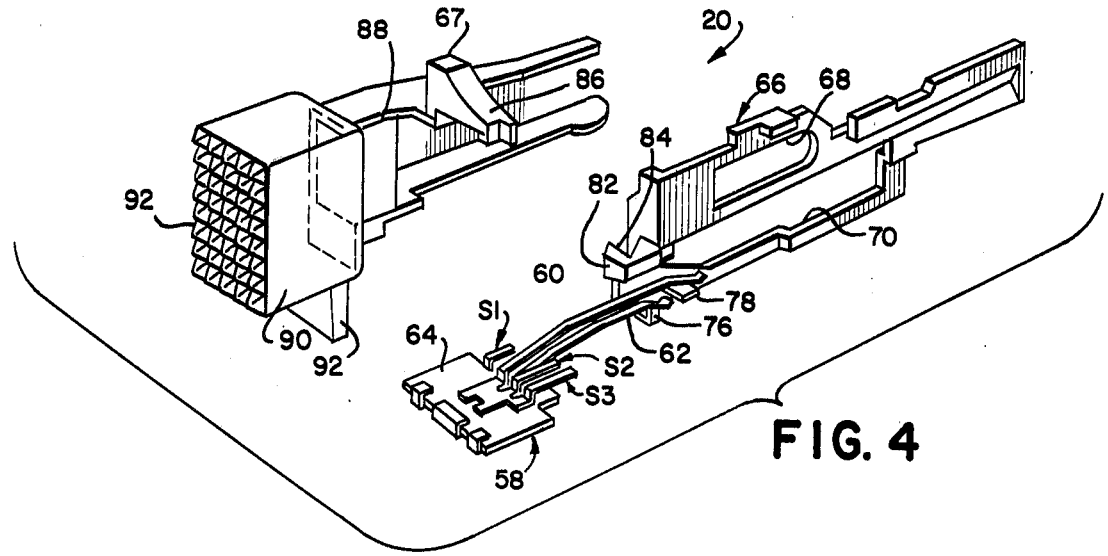
FIG. 4 is a perspective view, shown in exploded fashion, of selected components forming one of the actuators of the improved dual actuator system of the present invention.
Figure 5:
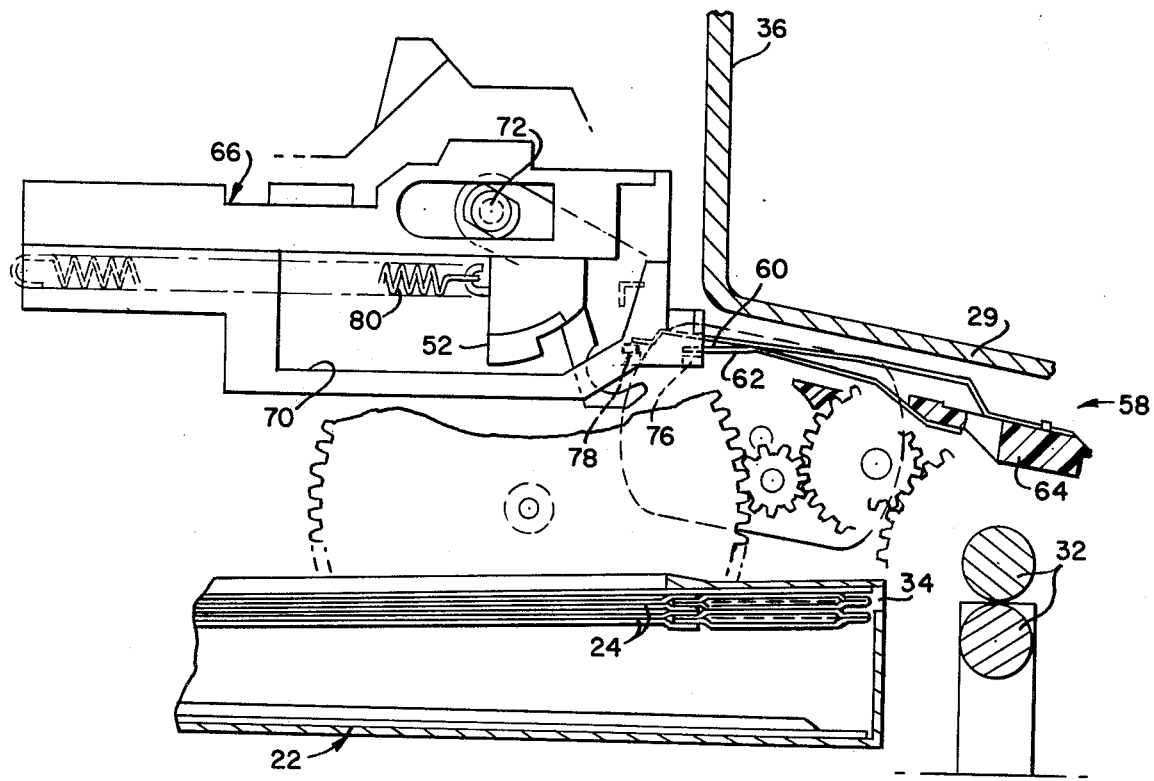
FIG. 5 is a side elevational view forming one of the actuator arrangements of the dual actuating system of the present invention.
Figure 6:
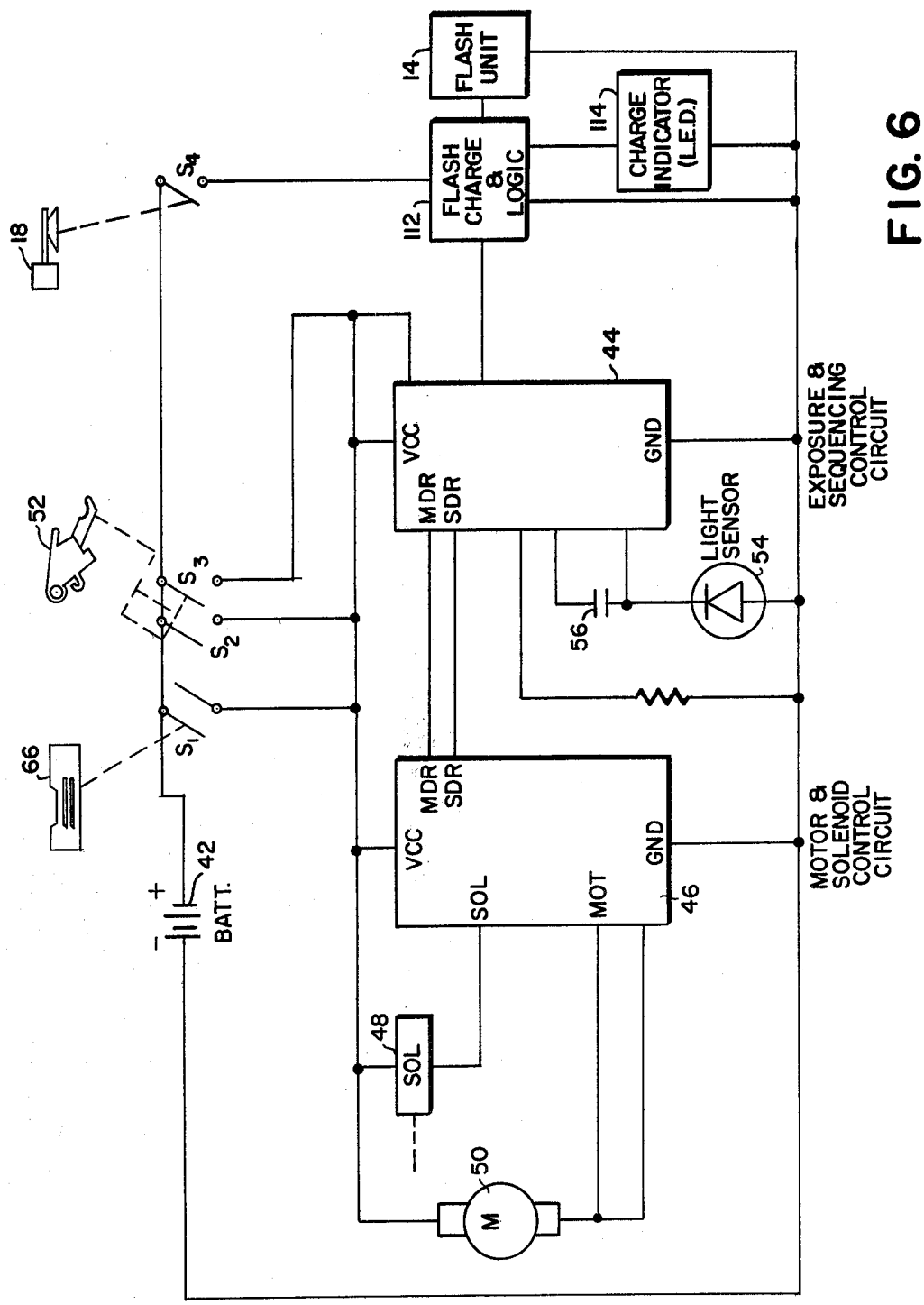
FIG. 6 is an electrical block diagram of the camera's electrical switch system showing the various electrical switches which are to be actuated by the noted dual actuating system of the present invention.

Reference is now made to the dual actuating arrangement 16 of the present invention. As mentioned, the dual actuating arrangement 16 includes a slider switch actuator 20 of the type disclosed in the aforenoted copending application Ser. No. 54,652. Reference is now made to FIGS. 4, 5 and 6 for better describing switches $S_1$, $S_2$, $S_3$. Since these switches do not per se form an aspect of the present invention, a detailed description thereof will not be presented. However, that structure which leads to a better understanding of the present invention will be set forth. For greater details regarding the structure and operation of these electrical components, reference is made to the last aforenoted application as well as U.S. Pat. No. 4,040,072. $S_1$, $S_2$ and $S_3$ are mounted on a switch block 58 that is housed within the apron housing section 29. Closing of the $S_1$ switch acts to electrically connect an electrical battery 42 to an exposure and sequencing control circuit 44, a motor and solenoid control circuit 46 for operating shutter solenoid 48 and an electrical motor 50 for driving the processing rollers, film advance device and the camera sequencing wheel. Moreover, closing of the $S_1$ switch energizes the solenoid 48 for effecting release of the mechanical shutter latch. Release of the shutter latch allows counterclockwise pivotal movement of a switch actuator 52 (FIG. 5). This movement results in sequential closing of normally open shutters $S_2$ and $S_3$. In this embodiment, the $S_2$ switch is a power latch switch for maintaining electrical connection of the battery 42 to the circuits 44 and 46. By reason of this, the user is allowed to manually release the slider switch assembly to open $S_1$ without interruption of the automatic cycle. The $S_3$ switch is arranged to close after closing of the $S_2$ switch for providing a logic input signal to the circuit 44 from the battery. This indicates commencement of the automatic exposure cycle. As the shutter blades open, they allow monitoring of the scene lighting conditions. Achievement of this is brought about by a light integrating circuit. This circuit includes a light sensor or photocell 54 and associated therewith a capacitor 56. The photocell 54 and the capacitor 56 are connected for providing a trigger signal or a voltage indicative of the quantity of scene light reaching the sensor on a time basis. Receipt of the trigger signal operates the circuits 44 and 46 for once again energizing the solenoid 48 and for closing the shutter blades to thereby terminate exposure. Following this, the motor 50 is operated for effecting film processing and driving of a sequencing wheel (not shown) for causing reset including the opening of switches $S_2$ and $S_3$.

The $S_1$ switch includes an elongated top contact 60 and spaced therefrom a bottom contact 62. These contacts 60 and 62 project rearwardly from the underside of an electrically insulating terminal board 64. Only the portions of the $S_2$ and $S_3$ switches which also project from the terminal board 64 are shown. This is because they do not pertain to the present invention.

Still referring to the slider switch actuator 20, it includes elongated slider 66 and slide actuator 67. The elongated slider 66 is made of a generally flat molded plastic body having an upper longitudinally extending opening 68 and a somewhat longer opening 70 therebelow. The upper opening 68 provides access for pivot shaft 72 of the switch actuator 52 which is operative for actuating switches $S_2$, $S_3$. Also, the upper opening 68 permits longitudinal movement of the slider 66 between its first or inoperative position to its second or operative position. Forwardly extending from the slider 66 is a finger 76 and laterally spaced therefrom a rear finger 78. When the slider 66 is in an inoperative position (FIG. 4), the upper and lower contacts 60 and 62 rest, respectively, on fingers 76 and 78; and $S_1$ is open. When the contacts 60, 62 engage each other, they close switch $S_1$ (FIG. 5). The force normally pushing the slider 66 to the inoperative position is provided by a biasing spring 80 and the fingers 76, 78 are effective for causing separation of the contacts 60 and 62.

Reference is made to FIG. 4 for better describing the actuator 20. The slider 66 and slide actuator 67 are coupled together for effecting the desired movement from the inoperative to the operative position. A notch coupling flange 82 at the forward end of the slider 66 includes a V-shaped notch 84 for receiving a coupling tab 86 on the slider actuator member 67. In this embodiment, the slider actuator 67 includes an offset or main body portion 88 which is slidably mounted in the actuator housing 69 (FIGS. 2, 3). Formed at the forward portion of the slider actuator 67 so as to be positioned outside the actuator housing 69 is a manually accessible finger operated push button member 90 having a finger accessible push button surface 92. Depending from the push button 90 is a vertically positioned tab 94. Both the push button surface 92 and the vertically extending tab 94 are arranged so as to be conveniently, manually depressed by the index finger of a user. Thus, by pushing inwardly on the push button 90, the slider actuator 67 will also simultaneously move in the slider 66 inwardly against the bias of the spring 80. This effects movement of the fingers 76, 78 to allow the contacts 60 and 62 to come together to close normally open switch $S_1$.

Moreover, closing of the $S_1$ switch energizes the solenoid 48 for releasing the shutter latch to thereby allow counterclockwise movement of a switch actuator 52 to the position shown in FIG. 5. This movement causes, as noted, sequential closing of normally open switches $S_2$ and $S_3$.

The foregoing provides a camera actuator or second means operable upon manual displacement between operative and inoperative positions operable for energizing the exposure control system by having the battery 42 electrically connected thereto.

Reference is made to FIGS. 1-4 for illustrating the pivotal switch system 18 which is operable for charging the flash unit 14. Included in the system 18 is a molded plastic actuating cover 96. The cover 96 is pivotally connected at 98 to the side of the shutter section 36 above the slider actuating housing 69 for pivotal movement between its inoperative or off position (FIG. 3) and its operative or exposure position (FIG. 2). When the cover 96 is in its operative position, the $S_4$ switch (FIG. 6) is closed for purposes of charging the flash unit 14. When the cover 96 is in its off or inoperative position, it essentially serves to cover the slider switch actuator 20. By virtue of such covering, a camera user is greatly inhibited from manually pushing inwardly on the push button surface 92. Inadvertent closing of the $S_1$ switch is thus greatly minimized. Accordingly, the likelihood of a user depressing the slider switch arrangements, in an improper photographic sequence, is significantly diminished. Moreover, the cover 96 is formed with an open bottom end. This is for permitting the depending actuator tab 94 to extend beneath a bottom plane defined by the cover bottom; (FIG. 3). In this connection, a user is nonetheless capable of pressing inwardly on the push button tab 94 for effecting closing of $S_1$. Because of the positioning of the tab 94 rearwardly of the forward wall 100 of the cover 96 and the relatively small size of the tab 94 in comparison to push button surface 92 it is relatively difficult for a user to inadvertently press the tab for closing the $S_1$ switch when the cover 96 is in its covering position. Thus, a user would have to specifically intend to press the tab 94. Since the tab 94 is still accessible, independent exposure control operation of the camera is provided without having to actuate the flash unit 14. Thus, for instance, photographs can be taken through a window without the adverse effects brought about by flash.

The cover 96 includes a generally hollow interior defined by opposed end walls 100, 102 and side walls 104. As seen in FIG. 3, the cover 96 covers the actuator housing 69 and the push button 92. A recess 105 is formed on the interior side wall 104 and is sized to accommodate an electrical contact member 106 of switch $S_4$ (FIG. 3). The contact member 106 extends outwardly from the housing section 36. The end wall 102 is configured and positioned for being easily engaged by a user's thumb. Mounted on an interiorly disposed ledge 108 in the cover 96 is an electrical switch contact element 110 of switch $S_4$. The switch contact element 110 is constructed to engage the contact member 106 when the cover is moved upwardly to its operating position. Because of the pivotal connection of the cover 96, a user can easily support the camera bottom with three fingers of the right hand, while using the thumb of the same hand to conveniently pivot the cover 96 to the noted operative position (FIG. 2) for closing $S_4$, while having the index finger free to depress inwardly the actuator 67 inwardly for effecting closing of the $S_1$ switch. The foregoing provides a first means or flash charge actuator operable upon movement between inoperative and operative positions for energizing the flash unit 14.

Closing of the normally open flash charge switch $S_4$ serves to electrically connect the battery 42 to a flash charge and logic circuit 112 (FIG. 6). This circuit 112 is also electrically connected to the exposure and sequencing control circuit 44, flash unit 14, and a flash charge state indicator circuit 114. This latter circuit 114 includes an indicator, such as a light-emitting diode, which may be seen by the user as he looks through the viewfinder tube 38. Thus, a normal cycle of camera operation is initiated by the sequential actuation of $S_4$ to charge the flash unit 12 and then $S_1$ to begin the automatic cycle of camera operation. Such diode indicates the charge state of the capacitor 56 in the flash unit 14. The specific operation of the $S_4$ switch is more clearly described in the last noted copending application. However, for better appreciating the operation of this invention only those details of $S_4$ which are necessary will be described. Upon closing of the $S_4$ switch, circuit 112 charges the storage capacitor 56 in the flash unit 14 while monitoring the state of charge and providing a continuously updated interior signal to the indicator circuit 114. During the exposure phase, the flash charge and logic circuit 112 feeds the appropriate flash fire and quench signals provided by exposure and sequencing control circuit 44 to the flash unit 14.

Based upon the foregoing detailed description, it is believed the operation of the improved dual actuator arrangement 16 of the present invention in terms of operating the camera exposure and the flash unit 14 are readily apparent. However, to briefly supplement the above description the following is set forth.

To actuate the dual actuating switch arrangement 16, the user can initially pivot the cover 96 from its off position (FIG. 3) to its operative condition (FIG. 2). This is accomplished by simply having the end wall 102 pressed generally downwardly by the user's thumb. It will be appreciated that three fingers of the same hand support one side of the camera. Such pivotal movement will effect closing of the $S_4$ switch because the contact members 106 and 110 are brought into electrically conductive engagement. Owing to gravity, release of the thumb permits the cover 96 to resume its inoperative position. As noted, the flash unit 14 is then appropriately charged so that the flash unit can operate when $S_1$ is closed. When the cover 96 has been moved to its operative condition, the push button surface 92 is freely accessible to the index finger. Thus, the flash actuating members 66, 67 can now be displaced from their inoperative position to their charging position for effecting closing of the $S_1$ switch. However, the switch arrangement 18 and the switch actuator 20 provide the user with the option to eliminate the flash operation of the camera by bypassing the flash charge stage. In this instance, the user merely presses inwardly on the tab 94 for closing the $S_1$ switch without charging the flash unit 14. Because of the arrangement and construction of the cover 96 relative to the push button 90 inadvertent actuation of the push button is greatly inhibited.

Because certain changes may be made in the above-described improved camera without departing from the scope of the invention herein involved, it is intended that all matter contained in the above description as shown in the accompanying drawings shall be interpreted as illustrative and not as limiting.

What is claimed is:

1. In an actuator apparatus for use with photographic apparatus having a housing, including an artificial illuminating device connected to said housing and being energizable for providing artificial illumination, means operable for initiating an exposure interval in response to being energized, means operable for energizing said device and said means for initiating an exposure interval, said actuator having first means operable for movement between inoperative and operative positions so that when in said operative position said energizing means energizes said device, and second means including a manually accessible portion movable between inoperative and operative positions in response to said accessible portion being manually actuated so that when in said operative position said energizing means energizes said exposure interval initiating means, the improvement comprising:

said first means including a cover connected to a portion of said housing for movement between said inoperative and operative positions so that when in said inoperative position said cover is in generally covering relationship to said manually accessible portion of said second means while allowing limited manual access thereto so as to thereby inhibit inadvertent movement while permitting deliberate movement of said manually accessible portion, said cover when moved to said operative position connects said energizing means to said device and simultaneously provides greater manual access to said manually accessible portion to facilitate subsequent manual movement of said second means from said inoperative to said operative position.

2. The apparatus of claim 1 wherein said cover is pivotally connected to said housing for pivotal movement between said inoperative and operative positions.

3. The apparatus of claim 2 wherein said cover has an exterior surface constructed and positioned to enable a user's thumb to make contact therewith for pivoting said cover from said inoperative position to said operative position, and said manually accessible portion being constructed and positioned to enable a user's index finger to move said second means to said inoperative position while the thumb engages said exterior surface.

4. The apparatus of claim 3 wherein said cover includes a first switch element movable therewith and said first means includes a second stationary switch element protruding from said housing and being constructed and arranged to make releasable electrical contact with said first switch element when said cover moves to its operative position.

5. The apparatus of claim 1 wherein said manually accessible portion has depending therefrom a manually accessible tab constructed to extend below a space covered by said cover when in said inoperative position, thereby permitting independent movement of said second means.

6. In a photographic camera having a flash device operable when charged for producing scene illumination upon receipt of a flash trigger signal, a flash charging switch arrangement including a charge actuator manually displaceable between an off position wherein said flash device is decoupled from a source of electrical power and a charge position wherein said flash device is coupled in charging relation to said source, a camera actuator manually displaceable between an off position, wherein the camera exposure control system is inoperative to produce an exposure and an exposure position, wherein said exposure control system is rendered operative to produce an exposure and said flash trigger is provided to said flash device to illuminate the scene; the improvement wherein said charge actuator includes a cover portion which generally covers a finger engagable portion of said camera actuator when said charge actuator is in its said off position while allowing limited manual access thereto so as to inhibit inadvertent movement of said finger engagable portion while permitting deliberate movement of said finger engagable portion and uncovers said finger engagable portion when said charge actuator is in its said charge position such that the camera operator in displacing said charge actuator to uncover the camera actuator provides charging of said flash device.

7. The camera of claim 6 wherein said cover is pivotally connected to said camera for pivotal movement between its off and charging positions.

8. The camera of claim 7 wherein said cover has an exterior surface constructed and positioned to enable a user's thumb to make contact therewith for pivoting said cover from said inoperative position to said operative position, and said camera actuator including a manually accessible portion being constructed and positioned to enable a user's index finger to move said camera actuator to said charge position while the thumb engages said exterior surface.

9. The camera of claim 8 wherein said cover includes a first switch element movable therewith and said charge actuator includes a second stationary switch element protruding from said camera and being constructed and arranged to make releasable electrical contact with said first switch element when said cover moves to its charge position.

10. The camera of claim 6 wherein said camera actuator includes a tab portion depending therefrom so as to extend below the space covered by said cover and being accessible to manual engagement for causing independent movement of said camera actuator relative to said charge actuator.

11. In an actuator apparatus for use with photographic apparatus having a housing, including an artificial illuminating device connected to said housing and being energizable for providing artificial illumination, means operable for initiating an exposure interval in response to being energized, means operable for energizing said device and said means for initiating an exposure interval, said actuator having first means operable for movement between inoperative and operative positions so that when in said operative position said energizing means energizes said device, and second means including a manually accessible portion movable between inoperative and operative positions in response to said accessible portion being manually actuated so that when in said operative position said energizing means energizes said exposure interval initiating means, the improvement comprising:

said first means including a cover connected to a portion of said housing for movement between said inoperative and operative positions so that when in said inoperative position said cover is in substantially covering relationship to said manually accessible portion of said second means to thereby inhibit inadvertent movement of said manually accessible portion, said cover when moved to said operative position connects said energizing means to said device and simultaneously provides greater manual access to said manually accessible portion to facilitate subsequent manual movement of said second means from said inoperative to said operative position, wherein said cover is pivotally connected to said housing for pivotal movement between said inoperative and operative positions.

12. The apparatus of claim 11 wherein said cover has an exterior surface constructed and positioned to enable a user's thumb to make contact therewith for pivoting said cover from said inoperative position to said operative position, and said manually accessible portion being constructed and positioned to enable a user's index finger to move said second means to said inoperative position while the thumb engages said exterior surface.

13. In an actuator apparatus for use with photographic apparatus having a housing, including an artificial illuminating device connected to said housing and being energizable for providing artificial illumination, means operable for initiating an exposure interval in response to being energized, means operable for energizing said device and said means for initiating an exposure interval, said actuator having first means operable for movement between inoperative and operative positions so that when in said operative position said energizing means energizes said device, and second means including a manually accessible portion movable between inoperative and operative positions in response to said accessible portion being manually actuated so that when in said operative position said energizing means energizes said exposure interval initiating means, the improvement comprising:

said first means including a cover connected to a portion of said housing for movement between said inoperative and operative positions so that when in said inoperative position said cover is in substantially covering relationship to said manually accessible portion of said second means to thereby inhibit inadvertent movement of said manually accessible portion, said cover when moved to said operative position connects said energizing means to said device and simultaneously provides greater manual access to said manually accessible portion to facilitate subsequent manual movement of said second means from said inoperative to said operative position, wherein said manually accessible portion has depending therefrom a manually accessible tab constructed to extend below a space covered by said cover when in said inoperative position, thereby permitting independent movement of said second means.

14. In a photographic camera having a flash device operable when charged for producing scene illumination upon receipt of a flash trigger signal, a flash charging switch arrangement including a charge actuator manually displaceable between an off position wherein said flash device is decoupled from a source of electrical power and a charge position wherein said flash device is coupled in charging relation to said source, a camera actuator manually displaceable between an off position, wherein the camera exposure control system is inoperative to produce an exposure and an exposure position, wherein said exposure control system is rendered operative to produce an exposure and said flash trigger is provided to said flash device to illuminate the scene; the improvement wherein said charge actuator includes a cover portion which covers a finger engagable portion of said camera actuator when said charge actuator is in its said off position and uncovers said finger engagable portion when said charge actuator is in its said charge position such that the camera operator in displacing said charge actuator to uncover the camera actuator provides charging of said flash device, wherein said cover is pivotally connected to said camera for pivotal movement between its off and charging positions.

15. The camera of claim 14 wherein said cover has an exterior surface constructed and positioned to enable a user's thumb to make contact therewith for pivoting said cover from said inoperative position to said operative position, and said camera actuator including a manually accessible portion being constructed and positioned to enable a user's index finger to move said camera actuator to said charge position while the thumb engages said exterior surface.

16. In a photographic camera having a flash device operable when charged for producing scene illumination upon receipt of a flash trigger signal, a flash charging switch arrangement including a charge actuator manually displaceable between an off position wherein said flash device is decoupled from a source of electrical power and a charge position wherein said flash device is coupled in charging relation to said source, a camera actuator manually displaceable between an off position, wherein the camera exposure control system is inoperative to produce an exposure and an exposure position, wherein said exposure control system is rendered operative to produce an exposure and said flash trigger is provided to said flash device to illuminate the scene; the improvement wherein said charge actuator includes a cover portion which covers a finger engagable portion of said camera actuator when said charge actuator is in its said off position and uncovers said finger engagable portion when said charge actuator is in its said charge position such that the camera operator in displacing said charge actuator to uncover the camera actuator provides charging of said flash device, wherein said camera actuator includes a tab portion depending therefrom so as to extend below the space covered by said cover and being accessible to manual engagement for causing independent movement of said camera actuator relative to said charge actuator.

* * * * *